United States Patent
Neidlinger et al.

(10) Patent No.: US 8,408,697 B2
(45) Date of Patent: Apr. 2, 2013

(54) HIGH REFRACTIVE INDEX OXYGEN PERMEABLE CONTACT LENS SYSTEM AND METHOD

(75) Inventors: Hermann Neidlinger, San Jose, CA (US); Ewa Cichacz, Phoenix, AZ (US); William E. Meyers, Scottsdale, AZ (US)

(73) Assignee: Paragon Vision Sciences, Inc., Mesa, AZ (US)

( * ) Notice: Subject to any disclaimer, the term of this patent is extended or adjusted under 35 U.S.C. 154(b) by 90 days.

(21) Appl. No.: 12/399,378

(22) Filed: Mar. 6, 2009

(65) Prior Publication Data

US 2009/0227702 A1  Sep. 10, 2009

Related U.S. Application Data

(60) Provisional application No. 61/034,860, filed on Mar. 7, 2008.

(51) Int. Cl.
- *G02C 7/04* (2006.01)
- *G02B 1/04* (2006.01)
- *C08F 290/06* (2006.01)
- *B29D 11/00* (2006.01)

(52) U.S. Cl. .................. 351/159.02; 523/106; 523/107; 523/108

(58) Field of Classification Search .................. 523/107
See application file for complete search history.

(56) References Cited

U.S. PATENT DOCUMENTS

| | | | |
|---|---|---|---|
| 4,242,483 A | 12/1980 | Novicky | |
| 4,303,772 A | 12/1981 | Novicky | |
| 4,594,401 A * | 6/1986 | Takahashi et al. | 526/279 |
| 4,640,941 A | 2/1987 | Park et al. | |
| 5,002,978 A | 3/1991 | Goldenberg | |
| 5,157,093 A | 10/1992 | Harisiades et al. | |
| 5,170,192 A * | 12/1992 | Pettigrew et al. | 351/161 |
| 5,331,073 A | 7/1994 | Weinschenk et al. | |
| 5,359,021 A | 10/1994 | Weinschenk et al. | |
| 6,555,030 B1 | 4/2003 | Weinschenk | |
| 6,951,894 B1 | 10/2005 | Nicolson et al. | |
| 7,235,195 B2 | 6/2007 | Andino et al. | |
| 7,279,505 B2 | 10/2007 | Phelan et al. | |
| 2007/0002470 A1 | 1/2007 | Domschke et al. | |

FOREIGN PATENT DOCUMENTS

WO   WO2006126095   11/2006

* cited by examiner

*Primary Examiner* — Peter F Godenschwager
*Assistant Examiner* — David Karst
(74) *Attorney, Agent, or Firm* — Snell & Wilmer L.L.P.

(57) ABSTRACT

A new high refractive index, oxygen permeable contact lens material and method for making the same. The material comprises an alkyl acrylate, a fluoro acrylate, a silicone acrylate, a polymerizable vinyl monomer having a substituted aromatic ring and/or heterocyclic ring structure, a multifunctional acrylate, and a polymerizable vinyl monomer having a heterocyclic ring structure.

18 Claims, 1 Drawing Sheet

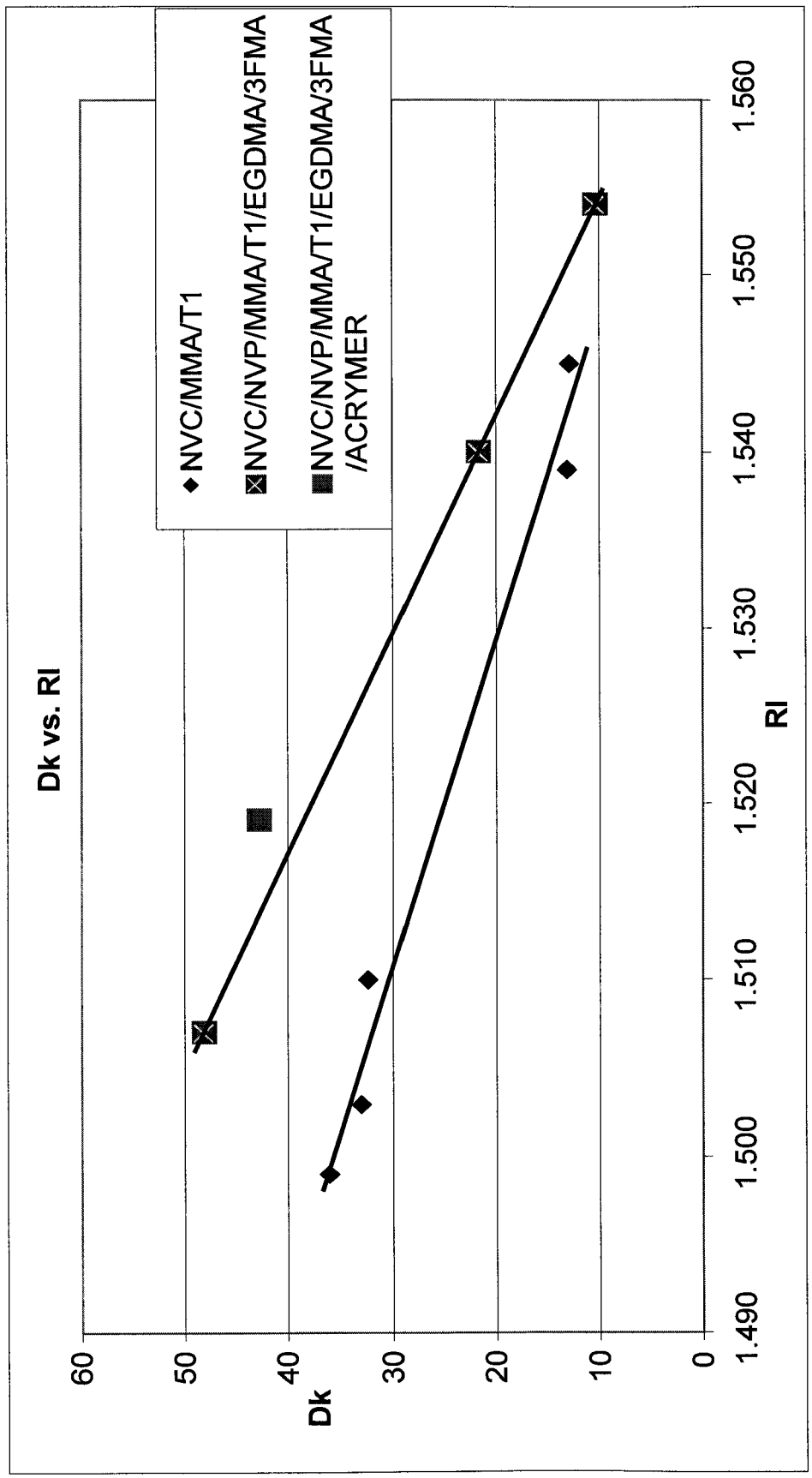

HIGH REFRACTIVE INDEX OXYGEN PERMEABLE CONTACT LENS SYSTEM AND METHOD

CROSS REFERENCE TO RELATED APPLICATIONS

This application claims priority from U.S. Provisional Patent Application Ser. No. 61/034,860 entitled "High Refractive Index Oxygen Permeable Contact Lens System and Method," filed Mar. 7, 2008, which is hereby incorporated by reference in its entirety.

FIELD OF THE INVENTION

This invention relates to contact lenses. More particularly, this invention relates to oxygen permeable, optically transparent, high refractive index form stable contact lens systems and a method for manufacturing the same.

BACKGROUND OF THE INVENTION

Various materials for making contact lenses are known in the art. The earliest contact lenses were made of glass material. However, the glass caused severe eye irritation such that the lenses could not be worn for extended periods of time. To overcome this disadvantage, later-developed contact lenses were made of polymethyl methacrylate (PMMA). However, early PMMA lenses did not allow passage of oxygen to the cornea, which caused eye discomfort and edema.

A contact lens material must not only have an acceptable level of oxygen permeability but, in addition, must have a high refractive index to provide visual acuity at both near and far distances, an adequate surface wettability, a good dimensional stability, a resistance to surface deposits, and must be durable to withstand handling.

In the latter part of the 20th century, other polymeric materials were developed for use in contact lenses. For example, in 1999, silicone hydrogel materials were developed. However, although silicone hydrogels provided increased oxygen permeability, the silicone made the lens surface hydrophobic and less wettable, resulting in discomfort and dryness during wear. This less-than-desirable dryness has resulted in limited acceptance of such lenses in the marketplace.

Polymeric materials have also been used to make bifocal contact lenses. For example, a single polymer or copolymer such as a methacrylate may be used. However, in such lenses, the near vision portion must be relatively thick, which can cause user discomfort due to increased pressure on the cornea.

It is also known to use two polymeric materials to make bifocal contact lenses. For example, the contact lens may comprise polymethyl methacrylate for the distance vision portion of the lens (refractive index: 1.49) and polystyrene (refractive index: 1.59) for the near vision portion of the lens. However, contact lenses formed in this manner have low oxygen permeability which can also result in discomfort and edema.

Other ways have been suggested for making two-piece bifocal lenses. For example, U.S. Pat. No. 5,170,192, (Pettigrew et. al.), entitled "Oxygen Permeable Bifocal Contact Lenses and their Manufacture" discloses a two-piece oxygen permeable bifocal contact lens by forming a low index crosslinked oxygen permeable copolymer preform with a recess, and casting a high index material therein. However, such two-piece lenses still suffer from inadequate oxygen permeability through the high index segment. These lenses also often experience warping, ruptures and other dimensional instabilities.

Accordingly, it would be advantageous to provide a monofocal and bifocal ophthalmic lens material which has good optical properties, including optical clarity and high refractive index and, in addition, acceptable oxygen permeability without the disadvantages of the conventional materials noted above.

SUMMARY OF THE INVENTION

While the way that this invention overcomes the disadvantages of the known art will be discussed in greater detail below, in general, disclosed herein is a new contact lens material which provides useful optical properties such as an increased refractive index, oxygen permeability, optical clarity, homogeneity, biocompatibility, and deformability at a cost similar to conventional contact lens materials.

In accordance with various embodiments, a contact lens composition comprises: an alkyl acrylate or methacrylate, such as methyl methacrylate, present in an amount of about 7% to about 15% by weight of the composition; a fluoro acrylate, such as trifluoroethyl methacrylate, present in an amount of about 1% to about 4% by weight of the composition; a silicone acrylate or silicone methacrylate, such as tris(trimethylsiloxy)-3-methacryloxypropylsilane, present in an amount of about 30% to about 60% by weight of the composition; a polymerizable vinyl monomer having a substituted aromatic ring and/or heterocyclic ring structure, such as N-vinyl carbazole, present in an amount of about 22% to about 36% by weight of the composition; a multifunctional acrylate, such as ethylene glycol dimethacrylate, present in an amount of about 5% to about 7% by weight of the composition; and a polymerizable vinyl monomer having a heterocyclic ring structure, present in an amount of about 6% to about 13% by weight of the composition.

BRIEF DESCRIPTION OF THE DRAWINGS

FIG. 1 is a graph showing the effect of varying the amounts of n vinyl carbazol and n-vinyl pyrrolidone in the composition on oxygen permeability and refractive index.

DETAILED DESCRIPTION

The description that follows is not intended to limit the scope, applicability, or configuration of the invention in any way. Rather, it is intended to provide a convenient illustration for implementing various exemplary embodiments. While these exemplary embodiments are described in sufficient detail to enable those skilled in the art to practice the invention, it should be understood that other embodiments may be realized and that logical, chemical and mechanical changes may be made without departing from the spirit and scope of the invention. For example, various changes may be made in the composition of the materials described in these embodiments and the methods of manufacturing the contact lenses. Moreover, the steps recited in any of the methods or processes disclosed herein may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step.

That said, an oxygen permeable, high refractive index contact lens composition is provided. The composition of the contact lens material is a cross-linked polymeric material comprising a plurality of monomeric components. The interaction of the monomeric components results in a contact lens having an increased refractive index, clarity and high oxygen permeability.

In various embodiments, a contact lens composition comprises a monomeric component of a sufficiently high molecular weight so as to be useful for optically transparent, form-stable materials of construction. For example, the contact lens composition may comprise an alkyl acrylate. An alkyl acrylate may be any material having the formula:

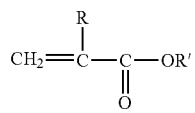

where R=H or a monovalent organic radical having not more than 7 carbon atoms and R'=a monovalent organic radical having up to 20 carbon atoms.

In an embodiment, the alkyl acrylate is methyl methacrylate. However, it will be understood that the composition may comprise any acrylate, alkyl acrylate and/or mixture thereof, or other material having a sufficiently high molecular weight. This component may be present in an amount of about 0% to about 20% by weight of the contact lens composition. In various embodiments, this component is present in an amount of about 7% to about 15% by weight of the composition.

In various embodiments, contact lens composition may comprise a monomeric component that is sufficiently non-tacky to reduce the tackiness of the cross-linked material and resists deposition of protein and other materials. For example, the composition may comprise a material selected from a group comprising fluoro acrylates, fluoro methacrylates, and/or mixtures thereof. A fluoro acrylate may be any material having the formula:

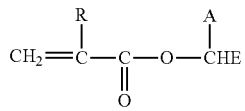

where R=H or a monovalent organic radical up to about 7 carbon atoms; A=H or E, and E is a fluorinated monovalent radical having up to about 20 carbon atoms.

In an embodiment, the fluoro acrylate is trifluoroethyl methacrylate. However, it will be understood that the composition may comprise any fluoro acrylate and/or fluoromethacrylate, or any other material which reduces the tackiness of the cross-linked polymer material. This component may be present in an amount of about 0% to about 10% by weight of the contact lens composition. In various embodiments, this component is present in an amount of about 1% to about 4% by weight of the composition.

In various embodiments, a contact lens composition may comprise a monomeric component having high oxygen permeability. For example, the composition may comprise a material selected from a group comprising silicone acrylates, silicone methacrylates, and/or mixtures thereof. A silicone acrylate may be any material having the formula:

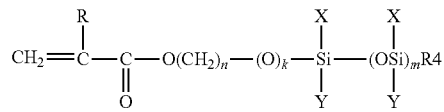

where R=one of: (1) H; (2) a monovalent organic radical having from about 1 to about 7 carbon atoms; or (3) Z (as defined below). X and Y are monovalent organic radicals having from about 1 to about 7 carbon atoms or are Z.

Z is:

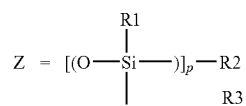

where R1, R2, and R3 are the same or different monovalent organic radicals having from about 1 to about 7 carbon atoms and R4 is OH or a monovalent organic radical having from about 1 to about 7 carbon atoms; and k=about 0 to about 1; m=about 1 to about 3; n=about 1 to about 5; and p=about 1 to about 3.

In an embodiment, the silicone acrylate is tris(trimethylsiloxy)-3-methacryloxypropylsilane (T1). However, it will be understood that the composition may comprise any silicone acrylates, silicone methacrylates, and/or mixtures thereof or any other material that has high oxygen permeability. This component may be present in an amount of about 10% to about 70% by weight of the contact lens composition. In various embodiments, this component is present in an amount of about 30% to about 60% by weight of the composition.

In various embodiments, the contact lens composition may comprise a monomeric component with a high-refractive index. For example, the composition may comprise a material selected from a group of polymerizable vinyl monomers having a substituted aromatic ring and/or heterocyclic ring structure, and/or mixtures thereof. In an embodiment, this component is one or a combination of N-vinyl carbazole, 3-(N-carbazoyl)propyl acrylate, and 4-(N-carbazoyl)methylstyrene. However, it will be appreciated by one skilled in the art that any component having a high refractive index, for example, 1.51, and in various embodiments, at least about 1.54 or higher, may be used. This component may be present in an amount of about 20% to about 40% by weight of the contact lens composition. In various embodiments, this component is present in an amount of about 22% to about 36% by weight of the composition.

In various embodiments, a contact lens composition may comprise a monomeric component that is a cross-linking agent. For example, the composition may comprise a material selected from a group comprising multifunctional acrylates, methacrylates and mixtures thereof. In an various embodiments, the composition comprises ethyleneglycol dimethacrylate. However, it will be understood that any material that will effectively cross-link the polymer material may be used. This component may be present in an amount of about 0.1% to about 15% by weight of the composition. In various embodiments, this component is present in an amount of about 5-7% by weight of the composition.

In various embodiments, a contact lens composition may comprise a monomeric component which aids in the dissolution and compatibilization of the other monomeric components without being detrimental to the other properties of interest. For example, the material may comprise a material selected from a group comprising polymerizable vinyl monomers having a heterocyclic ring structure and/or mixtures thereof. In an embodiment, the composition comprises N-vinyl pyrrolidone. However, it will be understood that any suitably hydrophilic and wetting material which aids in dissolution of the composition may be used. This component may be present in an amount of about 2% to about 20% by weight of the composition. In various embodiments, this component is present in an amount of about 6% to about 13% by weight of the composition.

A contact lens composition may further comprise an initiator monomeric component to initiate the cross-linking polymerization process. For example, the composition may comprise azobisisobutyronitrile, such as is commercially available under the name Vazo-64, which is commercially available through DuPont. However, it will be understood that any polymerization agent may be used. This component may be present in an amount of about 0% to about 1% by weight of the composition. In various embodiments, this component is present in an amount of about 0.8% by weight of the composition.

In various embodiments, the contact lens composition comprises a combination of the above-described monomeric components in effective amounts so as to facilitate the formation of optically-clear, high refractive index and oxygen permeable materials suitable for manufacturing form stable contact lenses.

Without wishing to limit the disclosure to any particular theory of operation, it is believed that the presence of the vinyl hydrophilic wetting monomeric component (i.e., N-vinyl pyrrolidone) facilitates and results in the present optically clear polymeric materials having desirable high refractive index and oxygen permeability. The vinyl hydrophilic wetting monomeric component is very effective in achieving dissolution and compatibility of the other monomeric components, especially the dissolution of the vinyl monomer having a substituted aromatic ring and/or heterocyclic ring structure monomeric component (i.e., N-vinyl carbazole) responsible for the high refractive index with the silicone acrylate monomeric component responsible for the oxygen permeability. In various embodiments, if the vinyl hydrophilic wetting monomeric component is decreased, the polymerizable vinyl monomer monomeric component is also decreased in order to obtain optically clear materials, resulting in a lower refractive index for the resulting materials. Similarly, if the vinyl hydrophilic wetting monomeric component is increased, the polymerizable vinyl monomer monomeric component may also be increased in order to obtain optically clear materials, resulting in a lower refractive index for the resulting materials.

In various embodiments, the monomeric components are mixed in effective amounts to form a contact lens having an oxygen permeability (Dk) of at least 22 Barrers and a refractive index of at least 1.51, but more preferably, at least 1.54.

The following examples, which are set forth by way of illustration and not by way of limitation, illustrate various embodiments of a contact lens composition. In the examples, the refractive index of each composition was determined on an Abbe refractometer at room temperature. The oxygen permeability of each composition was determined on a polarographic permeometer following the International Standards Organization (ISO). The Shore D hardness of each composition was determined at room temperature with a durometer.

EXAMPLE 1

| Monomeric Component | Weight % |
| --- | --- |
| Methyl methacrylate | 8 |
| Trifluoroethyl methacrylate | 1 |
| Tris(trimethylsiloxy)-3-methacryloxypropylsilane | 40 |
| N-vinyl carbazole | 33 |
| Ethyleneglycol dimethacrylate | 6 |
| N-vinyl pyrrolidone | 12 |
| Initiator[1] | 0.8 |

[1]Vazo 64

The resulting crosslinked copolymer has an index of refraction of 1.540, an oxygen permeability of 22 Barrers, excellent optical transparency (clarity), a D-Shore hardness of 80 and good mechanical properties.

EXAMPLE 2

| Monomeric Component | Weight % |
| --- | --- |
| Methyl methacrylate | 7.83 |
| Trifluoroethyl methacrylate | 1.10 |
| Tris(trimethylsiloxy)-3-methacryloxypropylsilane | 54.41 |
| N-vinyl carbazole | 22.33 |
| Ethyleneglycol dimethacrylate | 6.50 |
| N-vinyl pyrrolidone | 7.83 |
| Initiator[1] | 0.80 |

[1]Vazo 64

The resulting crosslinked copolymer has an index of refraction of 1.507, an oxygen permeability of 48 Barrers, excellent optical transparency (clarity), a D-Shore hardness of 78 and good mechanical properties.

EXAMPLE 3

| Monomeric Component | Weight % |
| --- | --- |
| Methyl methacrylate | 15 |
| Trifluoroethyl methacrylate | 1 |
| Tris(trimethylsiloxy)-3-methacryloxypropylsilane | 30 |
| N-vinyl carbazole | 36 |
| Ethyleneglycol dimethacrylate | 6 |
| N-vinyl pyrrolidone | 12 |
| Initiator[1] | 0.8 |

[1]Vazo 64

The resulting crosslinked copolymer has an index of refraction of 1.554, an oxygen permeability of 11 Barrers, excellent optical transparency (clarity), a D-Shore hardness of 82 and good mechanical properties.

EXAMPLES 4-8

Examples 4-8 were carried out in the same manner as Examples 1-3 and are listed in Table I. However, these formulations are missing components 5 and 6. In absence of components 5 and 6, these formulations provide lower Dk/refractive index characteristics as compared to the formulations described in Examples 1-3. (illustrated in FIG. 1).

TABLE I

| | Example | | | | |
|---|---|---|---|---|---|
| | 4 | 5 | 6 | 7 | 8 |
| Monomer | | | | | |
| Methyl methacrylate | 29.2 | 28.5 | 27.7 | 36.6 | 35.5 |
| T-1[1] | 50.8 | 49.5 | 48.3 | 31.4 | 30.5 |
| N-vinyl Carbazole | 20.0 | 22.0 | 24.0 | 32.0 | 34.0 |
| Vazo 64 | 0.8 | 0.8 | 0.8 | 0.8 | 0.8 |
| Properties | | | | | |
| Refractive Index | 1.499 | 1.503 | 1.510 | 1.539 | 1.545 |
| Oxygen Permeability (Barrers) | 36 | 33 | 32 | 13 | 13 |

[1]Tris(trimethylsiloxy)-3-methacryloxypropylsilane

As illustrated in FIG. 1, it has been observed by the inventors that if attempts are made to increase the refractive index of the formulations in Examples 4-8 by adding more of the high refractive index component (i.e., vinyl carbazole) into the formulation, resulting materials become opaque and unsuitable for contact lenses. To obtain optically clear, high refractive index materials which are oxygen permeable, the presence of a polymerizable vinyl copolymer having a heterocyclic ring structure (i.e., N-vinyl pyrrolidone) is crucial in assisting in the homogeneous dissolution of the high refractive index polymerizable vinyl monomer having a substituted aromatic ring and/or heterocyclic ring structure (i.e., vinyl carbazole) into the rest of the formulation, especially into the oxygen permeability promoting silicone acrylate and/or silicone methacrylate (tris(trimethylsiloxy)-3-methacryloxypropylsilane).

The presently-described contact lens composition may be produced using any known or hereinafter devised polymerization techniques. For example, the monomers can be blended together, cast into a tube and heated to an elevated temperature, such as in the range of about 38° C. to about 100° C. for a period of time in a range of about 1 hour to about 24 hours or more, to facilitate the polymerization reaction.

Catalysts and/or initiators, for example, selected from materials well known for such use in the polymerization art, may be included in the monomer mix to promote, and/or increase the rate of the polymerization reaction. Examples of such initiators include 2,2'-azobisisobutyronitrile, peroxides, UV initiators and the like and mixtures thereof.

In addition, effective amounts of ultraviolet light absorbing monomeric components, such as functionalized benzotriazole and benzophenone derivatives, may be included in the precursor monomer mix.

After polymerization, the rods formed in the tubes are then postcured, preferably at a temperature in the range of about 70° C. to about 130° C., for a period of time, such as for about 3 to about 30 hours. After curing (and post-curing), the rods are cut into cylindrical lens blanks. The lens blanks can be machined to produce finished contact lenses.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A high refractive index oxygen permeable contact lens comprising a cross linked polymeric material comprising:
   an alkyl acrylate present in an amount of between about 7% to about 15% by weight of the cross linked polymeric material;
   a fluoro acrylate present in an amount of between about 1% to about 4% by weight of the cross linked polymeric material;
   a silicone acrylate present in an amount of between about 10% to about 70% by weight of the cross linked polymeric material;
   n-vinyl carbazole present in an amount of between about 20% to about 40% by weight of the cross linked polymeric material;
   a cross-linking agent present in an amount of between about 0.1% to about 15% by weight of the cross linked polymeric material; and
   n-vinyl pyrrolidone present in an amount of between about 2% to about 20% by weight of the cross linked polymeric material;
   wherein the weight percentage of the n-vinyl pyrrolidone is about one third of the weight percentage of the n-vinyl carbazole; and
   wherein the contact lens has an index of refraction that is greater than 1.51 and an oxygen permeability of greater than 22 Barrers.

2. A contact lens according to claim 1, wherein the alkyl acrylate is present in an amount of between about 7% to about 12% by weight of the cross linked polymeric material.

3. A contact lens according to claim 2, wherein the alkyl acrylate is methyl methacrylate.

4. A contact lens according to claim 1, wherein the fluoro acrylate is present in an amount of between about 1% to about 3% by weight of the cross linked polymeric material.

5. A contact lens according to claim 4, wherein the fluoro acrylate is trifluoroethyl methacrylate.

6. A contact lens according to claim 1, wherein the silicone acrylate is present in an amount of between about 30% to about 60% by weight of the cross linked polymeric material.

7. A contact lens according to claim 6, wherein the silicone acrylate is tris(trimethylsiloxy)-3-methacryloxypropylsilane.

8. A contact lens according to claim 1, wherein the n-vinyl carbazole is present in an amount of between about 22% to about 36% by weight of the cross linked polymeric material.

9. A contact lens according to claim 1, wherein the cross-linking agent is present in an amount of between about 5% to about 7% by weight of the cross linked polymeric material.

10. A contact lens according, to claim 9, wherein the cross-linking agent is ethyleneglycol dimethacrylate.

11. A contact lens according to claim 1, wherein the n-vinyl pyrrolidone is present in an amount between about 6% to about 13% by weight of the cross linked polymeric material.

12. A contact lens according to claim 1, further comprising an initiator component present in an amount of about 0.8% by weight of the cross linked polymeric material.

13. A contact lens according to claim 12, wherein the initiator component is azobisiosobutyronitrile.

14. A method of formulating a high refractive index oxygen-permeable contact lens comprising a cross linked polymeric material comprising the steps of:
  combining by weight percent of the cross linked polymeric material:
    about 7-15% methylmethacrylate;
    about 1-4% trifluoroethylmethacrylate;
    about 10-70% silicone acrylate;
    about 20-40% n-vinyl carbazole;
    about 0.1-15% ethylene glycol dimethacrylate;
    about 2-20% by weight n-vinyl pyrrolidone; and
  selecting relative weight percentages of n-vinyl pyrrolidone and n-vinyl carbazole according to a linear relationship between the n-vinyl pyrrolidone and n-vinyl carbazole components to achieve a contact lens material having an oxygen permeability (Dk) of at least 22 Barrers and a refractive index of at least 1.51,
  wherein the weight percentage of the n-vinyl pyrrolidone is about one third of the weight percentage of the n-vinyl carbazole.

15. A method according to claim 14, wherein the relative weight percentages of n-vinyl pyrrolidone and n-vinyl carbazole are determined by increasing the weight percentage of the n-vinyl pyrrolidone substantially proportionately with the increase in weight percentage of the n-vinyl carbazole.

16. A method according to claim 14, wherein the relative weight percentages of n-vinyl pyrrolidone and n-vinyl carbazole are determined by decreasing the weight percentage of n-vinyl pyrrolidone substantially proportionately with the decrease in weight percentage of the n-vinyl carbazole.

17. A method according to claim 14, wherein the method further comprises the step of adding an effective amount of light absorbing monomeric components.

18. A high refractive index oxygen permeable contact lens comprising a cross linked polymeric material comprising:
  an alkyl acrylate present in an amount of between about 7% to about 15% by weight of the cross linked polymeric material;
  a fluoro acrylate present in an amount of between about 1% to about 4% by weight of the cross linked polymeric material;
  a silicone acrylate present in an amount of between about 10% to about 70% by weight of the cross linked polymeric material;
  n-vinyl carbazole present in an amount of between about 20% to about 40% by weight of the cross linked polymeric material;
  a cross-linking agent present in an amount of between about 0.1% to about 15% by weight of the cross linked polymeric material; and
  n-vinyl pyrrolidone present in an amount of between about 2% to about 20% by weight of the linked polymeric material;
  wherein the weight percentage of the n-vinyl pyrrolidone is adjusted to about one third of the weight percentage of the n-vinyl carbazole to achieve dissolution of the n-vinyl carbazole and to obtain an optically clear material; and
  wherein the contact lens has an index of refraction that is greater than 1.51 and an oxygen permeability of greater than 22 Barrers.

* * * * *

UNITED STATES PATENT AND TRADEMARK OFFICE
CERTIFICATE OF CORRECTION

PATENT NO. : 8,408,697 B2
APPLICATION NO. : 12/399378
DATED : April 2, 2013
INVENTOR(S) : Hermann Neidlinger et al.

Page 1 of 1

It is certified that error appears in the above-identified patent and that said Letters Patent is hereby corrected as shown below:

In the Claims

In Column 10 Line 27, after "weight of the" please insert --cross--.

Signed and Sealed this
Sixteenth Day of July, 2013

Teresa Stanek Rea
*Acting Director of the United States Patent and Trademark Office*